May 23, 1933.　　　N. BILLMAN　　　1,909,999

CASKET SPRAY RECEPTACLE

Filed Dec. 23, 1932

Inventor

Norma Billman

By Clarence A. O'Brien

Attorney

Patented May 23, 1933

1,909,999

UNITED STATES PATENT OFFICE

NORMA BILLMAN, OF SHEBOYGAN, WISCONSIN

CASKET SPRAY RECEPTACLE

Application filed December 23, 1932. Serial No. 648,713.

This invention relates to a receptacle adapted to be placed on a casket for holding flowers, the general object of the invention being to provide an inverted channel-shaped base having inwardly and upwardly extending flanges for resting on top of the casket and a receptacle of smaller dimensions than the base resting thereon or secured thereto and adapted to contain water with means for holding the flowers in the receptacle.

This invention also consists in certain other features of construction and in the combination and arrangement of the several parts to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1:
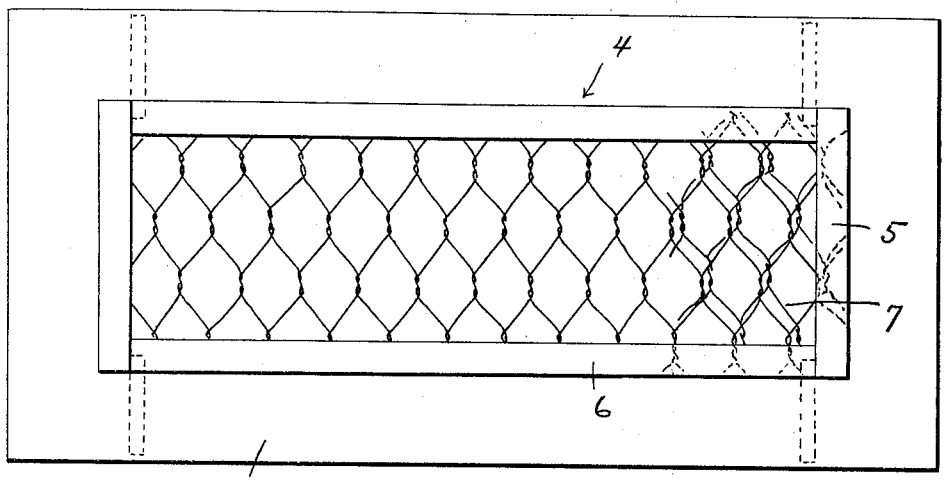
Figure 1 is a top plan view of the device.
Figure 2:
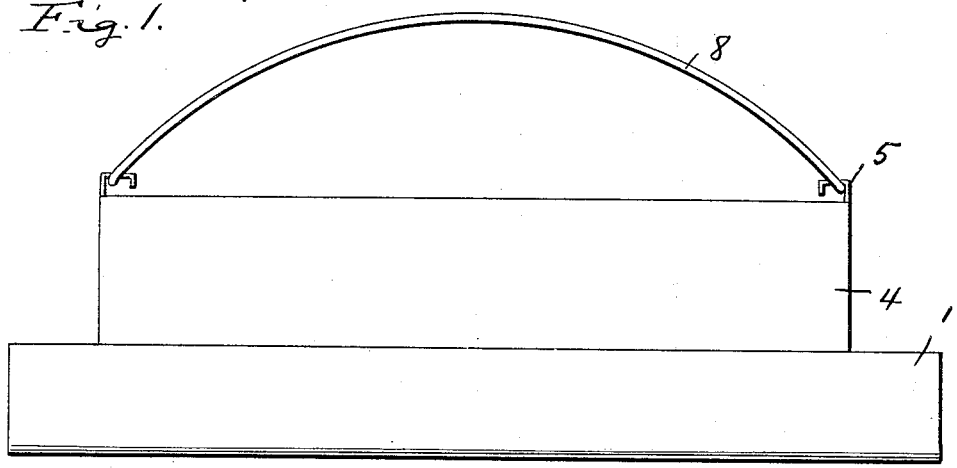
Fig. 2 is an elevation.
Figure 3:
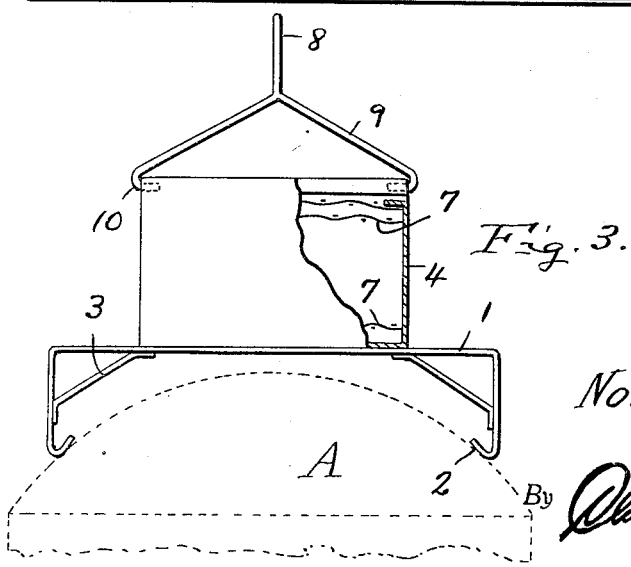
Fig. 3 is an end view partly in section showing how the device rests upon the casket.

In these views, the numeral 1 indicates a base which is of inverted channel shape with the lower edges of its limbs rounded and extending upwardly and inwardly as shown at 2 so that these parts will rest firmly upon the top of the casket shown at A in dotted lines in Fig. 3 and enables the device to be placed on caskets of different sizes. Braces 3 are provided for the limbs and a receptacle 4 of less width and length than the base has its bottom secured to the bight of the base. The end walls of the receptacle extend above the side walls and said end walls have their upper edges bent into channel shape as shown at 5 and the upper ends of the side walls are bent inwardly to form the flanges 6, these parts acting to reduce the danger of water being splashed from the receptacle when the device is being handled.

Wire mesh 7 is extended across the receptacle, two sheets of the wire mesh being placed adjacent the top of the receptacle, and a third piece adjacent the bottom thereof, as shown in Fig. 3, so that the stems of flowers and the like may be passed through the meshes which will firmly hold the flowers in place with their stems in the water placed in the receptacle.

A handle 8 has its forked ends 9 provided with the hooks 10 at their extremities engaging the channel parts 5 at the upper ends of the end walls of the receptacle, so that the device can be readily carried and this handle can be removed when desired. The portions of the base which are not covered by the receptacle may be covered with moss and greens of various kinds can be suitably fastened to this moss and this moss will act to absorb any water spilling from the receptacle.

The overlapping edges of the receptacle will hold the wire mesh in place and the weight of the flowers cannot pull the mesh out of place.

This device saves a great deal of time in placing flowers on the casket and will keep the flowers fresh for a long time.

It is thought from the foregoing description that the advantages and novel features of the invention will be readily apparent.

It is to be understood that changes may be made in the construction and in the combination and arrangement of the several parts provided that such changes fall within the scope of the appended claims.

Having thus described my invention, what I claim as new is:—

1. A spray holder for caskets comprising a base having its side edges bent downwardly with the lower edges of said side edges bent upwardly and inwardly to rest upon the top part of the casket, a receptacle seated on the base and means for holding flowers in the receptacle.

2. Means for holding sprays on a casket comprising a base of inverted channel shape having the lower edges of its limbs bent upwardly and inwardly to engage portions of the top of the casket, a receptacle seated on the base and of less width and length than the base, said receptacle adapted to contain water, a sheet of wire mesh stretched across the receptacle for holding the stems of flowers placed therein.

3. Means for holding sprays on a casket comprising a base of inverted channel shape having the lower edges of its limbs bent upwardly and inwardly to engage portions of the top of the casket, a receptacle seated on the base and of less width and length than the base, said receptacle adapted to contain water, a sheet of wire mesh stretched across the receptacle for holding the stems of flowers placed therein, the upper edges of the receptacle being formed with inwardly extending flanges.

4. Means for holding sprays on a casket comprising a base of inverted channel shape having the lower edges of its limbs bent upwardly and inwardly to engage portions of the top of the casket, a receptacle seated on the base and of less width and length than the base, said receptacle adapted to contain water, sheets of wire mesh stretched across the receptacle for holding the stems of flowers placed therein, the upper edges of the receptacle being formed with inwardly extending flanges, a handle detachably connected to the receptacle.

In testimony whereof I affix my signature.

NORMA BILLMAN.